Figure 1:
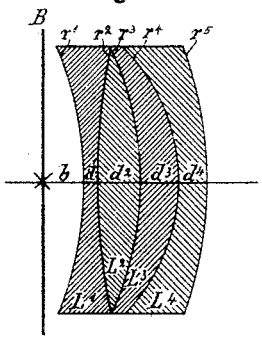

(No Model.)

P. RUDOLPH.
PHOTOGRAPHIC OBJECTIVE.

No. 532,398. Patented Jan. 8, 1895.

Witnesses:

Inventor:
Paul Rudolph,
by Marcellus Bailey
his attorney.

UNITED STATES PATENT OFFICE.

PAUL RUDOLPH, OF JENA, GERMANY, ASSIGNOR TO THE FIRM OF CARL ZEISS, OF SAME PLACE.

PHOTOGRAPHIC OBJECTIVE.

SPECIFICATION forming part of Letters Patent No. 532,398, dated January 8, 1895.

Application filed October 23, 1894. Serial No. 526,692. (No model.)

*To all whom it may concern:*

Be it known that I, PAUL RUDOLPH, doctor of philosophy, a subject of the Emperor of Germany, and residing at Jena, in the Grand Duchy of Saxe-Weimar, German Empire, have invented a new and useful Photographic Objective, of which the following is a specification.

My invention relates to photographic objectives and consists in a quadruple lens which may be used as a single objective or as a component of a double objective or doublet. This quadruple lens is distinguished by uniting with a very high distinctness even of the marginal portions of the image, and an extensive useful angle of field an exceedingly high rate of the relative intensity of light. Such result I obtain by cementing together two double lenses or couples of lenses each of which comprises a collecting lens and a dispersing lens and in one of which couples the refractive power of the collecting or positive component exceeds the refractive power of the dispersing or negative component, while in the other double lens the refractive power of the negative lens exceeds that of the positive lens. In following this principle of construction I may freely select the dimensions of the single lenses limited only by the kinds of glass, which are at my disposal, and by the special requirement to be met by the objective, without substantially altering by any of such combinations of lenses the above stated optical effects which are united in my quadruple lens.

In consequence of the great variability of shape of the quadruple lens constructed on my principle, the two component double lenses may both represent positive systems (*i. e.*, systems which are equivalent to collecting lenses) or only one of them may be positive the other being a negative system (equivalent to a dispersing lens) even of an infinitely long focal distance. If the quadruple lens is employed as a component of a double objective, both couples of lenses, of which the quadruple lens is composed, may form negative systems. Moreover the achromatization of the quadruple lens may be effected by achromatizing either of both double lenses or by providing them with contrary chromatic aberrations which compensate one another. Furthermore both couples of lenses may be associated in any order of combination, both collecting lenses or both dispersing lenses or the dispersing lens of the one couple and the collecting lens of the other couple being cemented together as may be required. Finally the above explained principle of construction does not prevent one from graduating at will the refractive power of the single lenses following one another.

As to the double objective, one or both components of which are quadruple lenses of the described kind, both separate lens systems may be of the same or a different focal length and the focal length of both or only of one may be positive. Moreover either lens system may be for itself completely corrected so as to be occasionally employed as a single objective or both lens systems may be constructed with aberrations of about the same amount but in contrary sense, so that the aberrations of either component compensate one another. If only one component of the double objective consists of the above described quadruple lens, the other component may be of any construction. It may consist of only one single lens or of any number of parts cemented together.

In the annexed drawings three different arrangements of objectives carried out according to my invention are shown in section.

Figure 2:
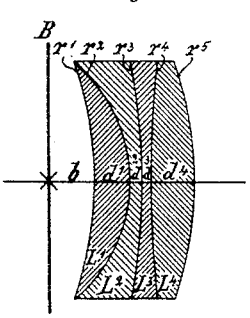
Figure 3:
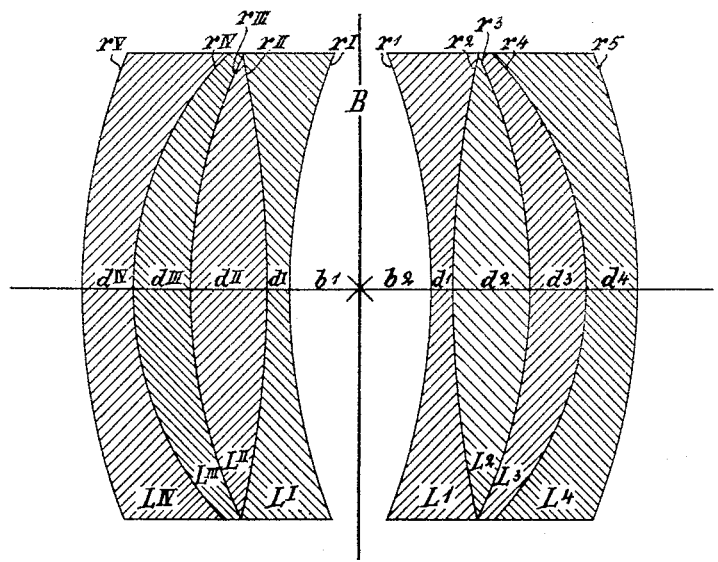

Figure 1 represents a quadruple lens, in which the two couples of lenses are cemented so as to associate the positive components of both couples. The first couple of lenses consists of a biconcave lens L' and a biconvex lens $L^2$, the second couple of a concavo-convex collecting lens $L^3$ and of a convexo-concave dispersing lens $L^4$. Fig. 2 represents a quadruple lens, in which the two couples of lenses are cemented so as to associate the negative components of both couples. The first couple of lenses consists of a concavo-convex collecting lens L' and of a convexo-concave dispersing lens $L^2$, the second couple of a biconcave lens $L^3$ and of a biconvex lens $L^4$. Fig. 3 represents a symmetrical double objective constructed of two equal quadruple lenses of the kind represented in Fig. 1, the component parts of one lens being indicated by 1, 2, 3, 4 as in Fig. 1, and the corresponding parts of the other lens by I, II, III, IV. Both lenses are separately corrected so as to be liable of being used as single objectives. In these three figures the line lettered with B represents the plane of the diaphragm, the letters $r'$, $r^2, r^3, r^4, r^5$ indicate the radii of curvature of the lens-surfaces and the letters $d', d^2, d^3, d^4$ denote the thicknesses of the single lenses in the optical axis. The letter $b$ in Figs. 1 and 2 and the letters $b'$ and $b^2$ in Fig. 3 denote the distance of the plane B of the diaphragm from the vertex of the next lens-surface.

In conclusion I append to this specification of my invention three examples of construction, which correspond to the three figures of the drawings. All dimensions (radii, thicknesses of lenses and distances of the diaphragm) are expressed by proportional numbers, the focal length of the whole objective being taken as unity. A simple multiplication of these numbers with the focal length required in any particlar case will suffice for obtaining the dimensions of the objective that is desired.

The different kinds of glasses are determined by the indices $n^D$ and $n^{G'}$ relating respectively to the D line of the solar spectrum and to the $H^\gamma$ line of the spectrum of hydrogen.

*First example.*—Quadruple objective lens represented on Fig. 1. Effective aperture 0.091. Angle of field more than eighty-five degrees.

| Radii. | Thicknesses of glass. | Distance of the diaphragm from the next lens surface. |
|---|---|---|
| $r' = -0.132$ | $d' = 0.0053$ | |
| $r^2 = +0.237$ | $d^2 = 0.0169$ | |
| $r^3 = -0.116$ | $d^3 = 0.0148$ | $b = 0.0158$ |
| $r^4 = -0.071$ | $d^4 = 0.0.06$ | |
| $r^5 = -0.138$ | | |

KINDS OF GLASS.

| | $n^D$. | $n^{G'}$. |
|---|---|---|
| $L' = L^3$: | 1.51000 | 1.52005 |
| $L^2$ : | 1.60852 | 1.62225 |
| $L^4$ : | 1.58250 | 1.60052 |

*Second example.*—Quadruple objective lens represented on Fig. 2. Effective aperture 0.074. Angle of field more than eighty-five degrees.

| Radii. | Thicknesses of glass. | Distance of diaphragm from the next lens-surface. |
|---|---|---|
| $r' = -0.143$ | $d' = 0.015$ | |
| $r^2 = -0.056$ | $d^2 = 0.004$ | |
| $r^3 = -0.290$ | $d^3 = 0.004$ | $b = 0.017$ |
| $r^4 = +0.497$ | $d^4 = 0.017$ | |
| $r^5 = -0.132$ | | |

KINDS OF GLASS.

| | $n^D$. | $n^{G'}$. |
|---|---|---|
| $L'$: | 1.51790 | 1.52882 |
| $L^2$: | 1.56063 | 1.57474 |
| $L^3$: | 1.51790 | 1.52916 |
| $L^4$: | 1.60954 | 1.62318 |

*Third example.* — Two equal quadruple lenses of the shape represented on Fig. 1 arranged symmetrically to form a double objectiver, this arrangement being represented on Fig. 3. Effective aperture 0.18. Angle of field about eighty-five degrees.

| Radii. | Thicknesses of glass. | Distance of the diaphragm from the next lens-surface. |
|---|---|---|
| $r' = -r^I = -0.229$ | $d' = d^I = 0.0091$ | |
| $r^2 = -r^{II} = +0.411$ | $d^2 = d^{II} = 0.0293$ | |
| $r^3 = -r^{III} = -0.201$ | $d^3 = d^{III} = 0.0256$ | $b' = b^2 = 0.0274$ |
| $r^4 = -r^{IV} = -0.123$ | $d^4 = d^{IV} = 0.0183$ | |
| $r^5 = -r^V = -0.239$ | | |

KINDS OF GLASS.

| | $n^D$. | $n^{G'}$. |
|---|---|---|
| $L' = L^3$: | 1.51000 | 1.52005 |
| $L^2$ : | 1.60852 | 1.62225 |
| $L^4$ : | 1.58250 | 1.60052 |

I claim as my invention—

A quadruple lens for single and double photographic objectives, consisting of two couples of lenses cemented together each of which couples consists of a collecting and a dispersing lens, the dispersing lens of one couple having a higher, the dispersing lens of the other couple having a lower refractive power than the collecting lens coupled therewith, substantially as described with reference to the drawings.

In testimony whereof I have signed my name to this specification in the presence of two subscribing witnesses.

PAUL RUDOLPH.

Witnesses:
 CARL KELLNER,
 RUDOLPH FRICKE.